United States Patent [19]

Burckhardt

[11] Patent Number: 4,676,399
[45] Date of Patent: Jun. 30, 1987

[54] DRY PELLET DISPENSING APPARATUS

[76] Inventor: Lennie L. Burckhardt, 109 N. Taylor St., Tyler, Minn. 56178

[21] Appl. No.: 786,731

[22] Filed: Oct. 11, 1985

[51] Int. Cl.$^4$ ............................................. B65G 59/06
[52] U.S. Cl. .................................. 221/207; 221/265; 222/370; 222/547; 422/266
[58] Field of Search ...................... 221/93, 94, 15, 252, 221/263, 264, 265, 207, 258, 211, 277; 222/370, 367, 547, 564; 210/198.1, 206; 422/263, 264, 266, 269, 271, 273

[56] References Cited

U.S. PATENT DOCUMENTS

| | | | |
|---|---|---|---|
| 204,390 | 5/1878 | Steckler, Jr. | 222/367 X |
| 689,508 | 12/1901 | McKnight | 111/77 |
| 1,490,365 | 4/1924 | Du Grenier | 221/207 X |
| 2,489,765 | 11/1949 | Emerson et al. | 221/93 X |
| 2,507,883 | 5/1950 | Blackman | 222/370 X |
| 3,260,337 | 7/1966 | Greenwald et al. | 221/93 X |
| 3,785,525 | 1/1974 | Handeland | 221/265 |
| 4,169,419 | 10/1979 | Burgess | 222/370 X |
| 4,235,849 | 11/1980 | Handeland | 422/263 |
| 4,613,056 | 9/1986 | Olson | 221/211 |

Primary Examiner—Joseph J. Rolla
Assistant Examiner—Edward S. Ammeen
Attorney, Agent, or Firm—Burd, Bartz & Gutenkauf

[57] ABSTRACT

A dry chemical pellet dispensing apparatus particularly adaptable for treatment of well water with chlorine pellets or like water purification tablets. A downwardly open pellet container is secured to a pellet flow regulator housing, which discharges pellets onto the surface of a metering plate. The discharge housing has baffles to regulate pellet flow. The metering plate has arrays of compartments for holding individual pellets. Select compartments are open and select compartments are closed. Open compartments can each receive a pellet. The pellet is moved in the open compartment upon rotation of the metering wheel to a location over a drop opening leading to a discharge tube which drops the pellet into the well. The speed of rotation of the metering wheel and the density of open compartments determines the dosage rate of pellets administered to the well. The metering wheel is mounted in a guide plate, which has first and second positions with respect to a drive motor for imparting first and second rotational speeds to the metering wheel.

13 Claims, 7 Drawing Figures

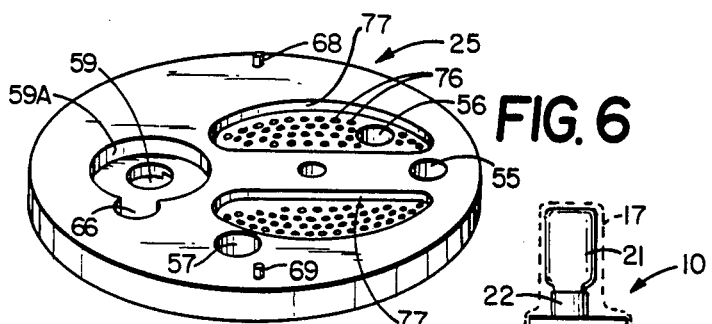
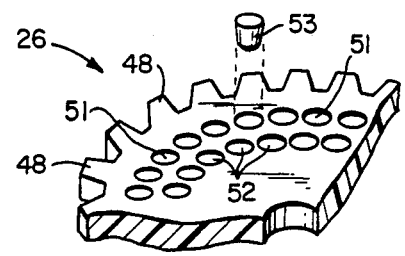
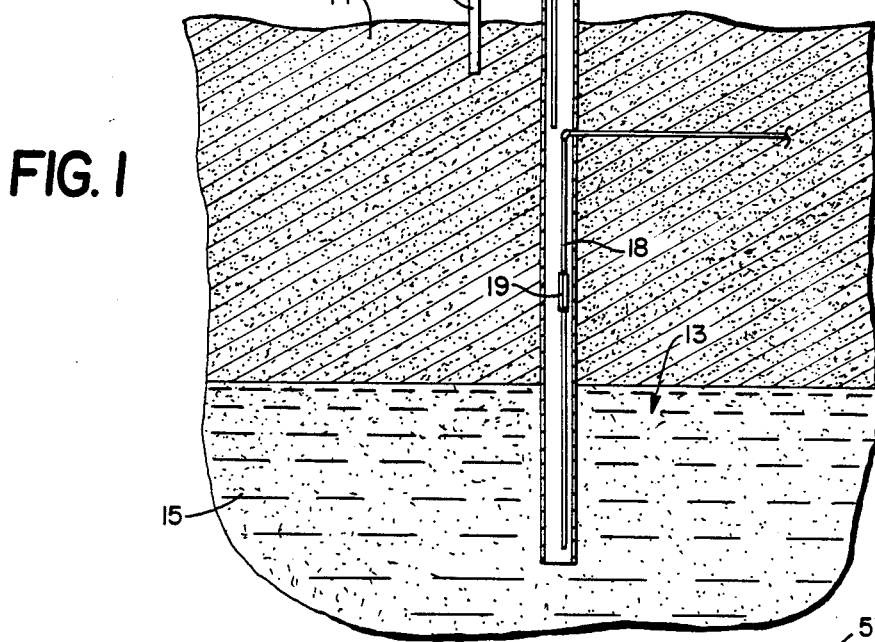
FIG. 6
FIG. 7
FIG. 1
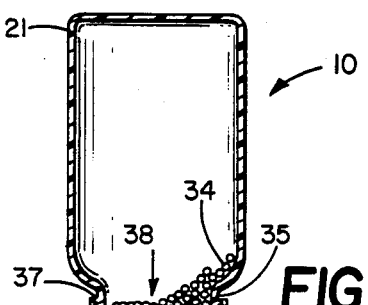
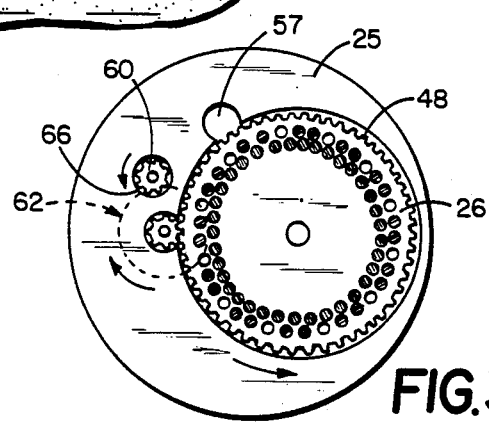
FIG. 2
FIG. 3
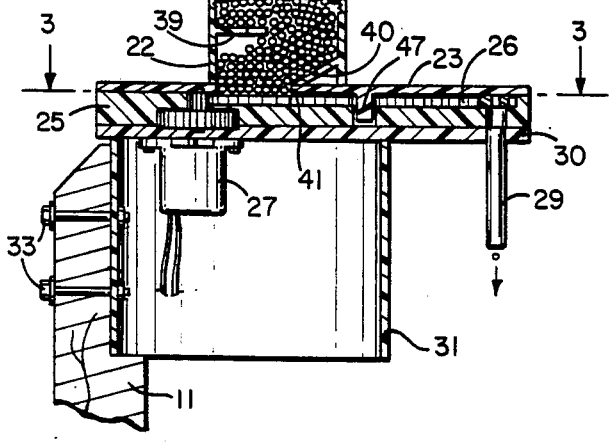
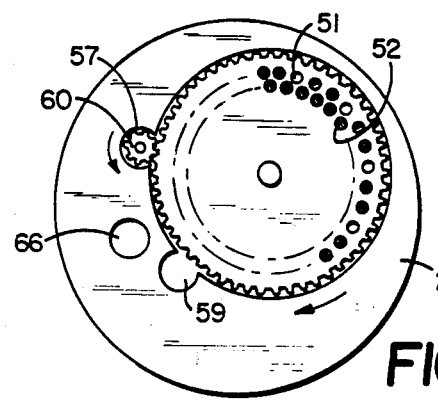
FIG. 4

4,676,399

DRY PELLET DISPENSING APPARATUS

BACKGROUND OF THE INVENTION

Water provided by certain wells requires chemical treatment in order to render the water acceptable for animal or home consumption according to the intended end use of the water. Chlorination is a widely accepted form of water treatment. It can be introduced into the well in the form of pellets before the water is pumped to its final destination in order to permit sufficient time for it to act upon the water.

Machines for periodically dispensing pellets into the well are commonly used. Such machines can operate responsive to the energizing of the delivery pump to deliver water from a deep well. For example, see U.S. Pat. No. 4,235,849, issued Nov. 25, 1980 to Handeland. Such apparatus preferably has an adjustable rate of delivery of chlorine to the well for regulation according to the needs of the particular well and are preferably easy to operate and maintain, particularly in cold northern climes.

SUMMARY OF THE INVENTION

The invention relates to a gravity-fed chemical tablet or pellet dispensing apparatus mountable with respect to an open well pipe of a well to periodically dispense individual pellets into the well for treatment of the water. A metering wheel is mounted for rotation about a vertical axis with respect to a guide plate and has a ring of pellet compartments. The compartments can be either open for use or plugged not to be used. The compartments pass under the discharge opening of a pellet flow regulator housing that is connected to a supply container of chemical pellets. The open compartments each are loaded with a pellet. Upon rotation of the metering wheel, the compartments pass over a drop opening, which is poised over the drop tube leading to the well. The pellets drop from the open compartments through the drop opening and through the drop tube into the well. The metering wheel is rotated by a drive motor through a gear arrangement. The rate of pellet discharge into the well is dependent upon the density of the open compartments in the metering wheel and the speed that the metering wheel rotates. The speed of rotation is governed by the gear ratio of the direct drive motor shaft connected to the metering wheel.

The flow regulator housing has baffle plates in an interior passageway, which prevent bridging and clogging of the pellets, thus to provide smooth and continuous supply of pellets for operation of the pellet discharge apparatus.

The compartments of the metering wheel are closable by insertion of removable plugs. The compartments left open are regularly spaced around the circumference of the metering wheel. There can be one or two rows of compartments. To increase the frequency of pellet discharge, more compartments are opened. To slow down the frequency of pellet discharge, compartments are closed with removable plugs. The compartments can be downwardly tapered with a corresponding plug shaped such that the plugs do not fall through the compartments.

IN THE DRAWINGS

FIG. 1 is a side elevational view of a pellet discharge apparatus according to the invention installed with respect to the well pipe of a well;

FIG. 2 is an enlarged side elevational view of the pellet discharge apparatus of FIG. 1 with portions in section for purposes of illustration;

FIG. 3 is a view of the metering wheel and guide plate of the apparatus of FIG. 2 taken along the line 3—3 thereof;

FIG. 4 is another view of the metering wheel and guide plate of the discharge apparatus of FIG. 2 showing the guide plate moved to a second position to alter the relationship between the drive motor and the metering wheel and change the speed of the metering wheel;

FIG. 6 is a view of the guide plate of FIG. 5 in perspective showing the bottom surface thereof; and FIG. 7 is an enlarged view of a peripheral portion of the metering wheel.

DESCRIPTION OF A PREFERRED EMBODIMENT

Figure 5:
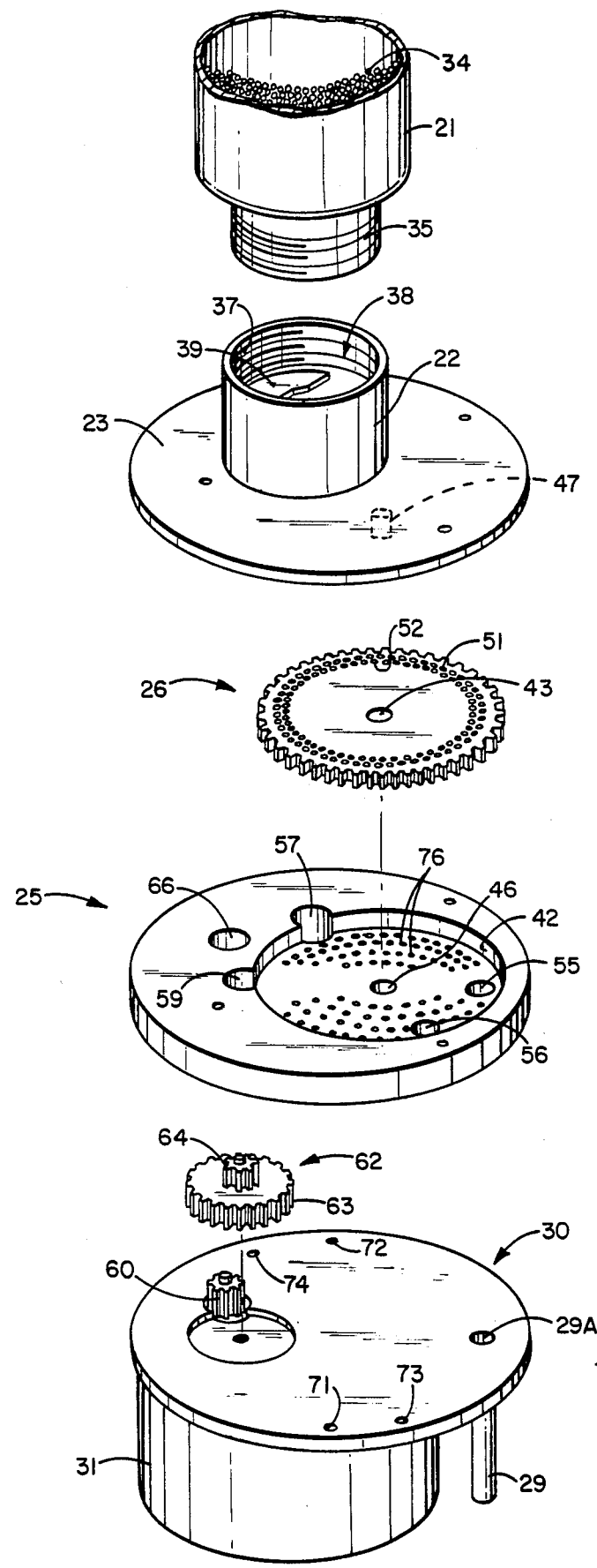
FIG. 5 is an exploded view of the pellet discharge apparatus.

Referring to the drawings, there is shown in FIG. 1 a pellet dispensing apparatus 10 according to the invention mounted on a support pillar 11 and poised for operation with respect to a well pipe 12, which is part of a well 13 dug deeply through ground 14 to a water supply 15. Dispensing apparatus 10 can have a removable shroud as indicated in phantom at 17 in FIG. 1. A water line 18 as part of well 13 extends from the water supply 15 upwardly and then curves outwardly of well pipe 12 and leads to the conventional water pressure tank (not shown), which is periodically refilled by water pump means 19 when the water supply held therein becomes low. Pellet dispensing apparatus 10 is operative responsive to the energizing of the pump 19 to regularly dispense pellets, such as chlorine tablets, down through the well pipe 12 into the water 15 for treatment thereof preparatory to being pumped to a house or other location for domestic use.

As shown in FIGS. 1 and 2, pellet dispensing apparatus 10 includes a pellet supply jar 21 mounted on a pellet flow regulator housing 22, which is secured to a cover 23. Cover 23 is mounted on a guide plate 25 which carries a metering wheel 26. Metering wheel 26 has a ring of pellet compartments and is driven by an electric drive motor 27 to receive pellets from the supply jar 21 and deliver them to a drop tube 29 where the pellets are dropped into the well pipe 12. The dosage frequency is determined by the rotational speed of the metering wheel 26 and the number of open pellet compartments is metering wheel 26.

Guide plate 25 is located on a mounting plate 30, which carries motor 27 and is connected to a cylindrical motor shroud 31. Motor shroud 31 is fixed to support pillar 11 by nut and bolt assemblies 33 to hold the apparatus 10 in the upright poised position.

As shown in FIGS. 2 and 5, pellet supply jar 21 carries a supply of pellets 34 and is in inverted orientation as assembled to apparatus 10. A reduced diameter downwardly open neck 35 is exteriorly threaded for connection to pellet flow regulator housing 22. Housing 22 has a discharge opening poised over a first location of the circular path of compartments moving with metering wheel 26. Housing 22 is generally cylindrical and is provided in order to prevent clogging of neck 35 or bridging of pellets 34 upon discharge from jar 21 so as to halt the flow thereof. Housing 22 has a central tubular passage 38 for flow of pellets that is partially obstructed by baffle means including a first baffle plate 39 and a second baffle plate 40. First baffle plate 39 is located intermediate the discharge passage 38 and is generally horizontal and spans a first portion of the discharge passage 38. The second baffle plate 40 is secured to interior side wall of housing 22 at a location downwardly removed or downstream from the first baffle plate 39. Second baffle plate 40 is downwardly inclined and spans a second portion of the discharge passage 38 diametrically opposite the first portion spanned by the first baffle plate. The lower edge of the second baffle plate 41 partially defines an outlet or discharge opening from housing 22 of the passage 38. The first and second baffle plates provide a circuitous route for the passage of pellets in order to avoid clogging and promote the free flow of pellets. First baffle plate 38 provides a stop or shelf in passage 38 leading to the second baffle plate 40, which provides an inclined passageway to the outlet of central passage 38.

Guide plate 25 has a circular recess or track 42 to mount metering wheel 26. Metering wheel 26 fits in track 42 and is rotatable in it. Metering wheel 26 has a central pivot opening 43. A corresponding pivot opening 46 is located in recess 42. A short pivot shaft 47 extends downwardly from the lower surface of cover plate 23 and is positioned for assembly in pivot openings 43 and 46 when metering wheel 26 is installed in track 42 and cover plate 23 is placed thereon with the outlet of pellet passage 38 poised over a perimeter portion of metering wheel 26. Both shaft 47 and track 42 are operative to guide metering wheel 26 for circular rotation about its central axis.

The side wall of metering wheel 26 has a continuous perimeter of gear teeth 48. Metering wheel 26 has a ring of compartments for receiving, carrying and depositing chemical pellets upon rotation in track 42. Each compartment is comprised as a passageway open between the top and bottom surfaces of wheel 26. In the configuration shown, metering wheel 26 has a first circular array or set of compartments 51 spaced slightly inward from the perimeter of wheel 26. A second set includes a second circular array of compartments 52 that are spaced radially inward a short distance from the first compartments 51. Each compartment is a suitable size to readily receive a single chemical pellet discharged from regulator housing 22 and transport it upon rotation of wheel 26 to a drop opening. Normally only selected compartments are kept open according to the desired pellet dosage, and the remaining are closed by removable plugs. As shown in FIG. 7, a plug 53 is removably placed in a compartment that is to go unused. The plug 53 is removable at such time that it is desired to use the compartment. For this purpose, plugs 53 and compartments 51, 52 can be slightly downwardly tapered as shown.

The assembly comprised of the cover plate 23 and guide plate 25 with metering wheel 26 fits on the support platform 30 in either one of two ways, as shown in FIGS. 3 and 4. The assembly is readily movable between the configurations shown in FIGS. 3 and 4. In the arrangement of FIG. 4, metering wheel 26 is driven by direct drive from drive motor 27 and is driven to rotate in a clockwise direction at a relatively slow speed. In FIG. 3, metering wheel 26 is driven by motor 27 through an intermediate gear and in a counterclockwise direction at a relatively higher rate of speed, as will be described. Drive motor 27 is mounted by suitable bolts on the undersurface of mounting platform 30 with a drive shaft extending upward therethrough through a suitable opening. The drive shaft carries a primary drive gear 60 which rotates on the motor drive shaft responsive to energization of the drive motor 27 which operates responsive to operation of the pump means 19.

Guide plate 25 has first and second pellet drop openings 55, 56 (FIG. 5) located in the base of track 42 and individually positionable over the delivery opening 29A to drop tube 29 on mounting platform 30. First and second gear access openings 57, 59 are provided in guide plate 25 in intersecting relationship to the track or groove 42 for access to the gear teeth 48 on metering wheel 26.

In the configuration shown in FIG. 4, the drive shaft of the drive motor 27 equipped with primary drive gear 60 is located in the first gear access opening 57. The teeth of the primary gear 60 mesh with the teeth 48 of metering wheel 26, as shown in FIG. 4. In this position, the first drop opening 55 is poised over the opening 29A of drop tube 29 on platform 30. Certain of the compartments 51, 52 are opened in order to receive pellets dropped from the container 21 and through the housing 22. When the drive motor 27 is operative, metering wheel 26 is driven in a clockwise direction, as shown in FIG. 4. As the open compartments pass under the regulator housing 22, pellets are deposited in them. The pellets are carried over the base of the track 42 until the compartments pass over the first drop opening 55. At this point, the pellets drop out of the compartments and through the drop tube 29 into the well pipe 12. The metering wheel 26 is driven at a relatively slow rate of speed in this configuration.

The other configuration is that shown in FIG. 3 and also illustrated in FIGS. 2 and 5. The purpose of changing the configuration is to provide an increase or decrease in the speed of rotation of metering wheel 26 through the addition or deletion of an intermediate gear. The configuration change between FIGS. 3 and 4 is made simply by lifting the guide plate off of the support platform, rotating it and then replacing it, as will be more fully described, while either adding or deleting the intermediate gear.

In the configuration of FIG. 3, an intermediate gear 62 is introduced between the primary gear 60 being driven by the drive motor 27 and the gear teeth 48 of metering wheel 26. As shown in FIG. 5, intermediate gear 62 has a lower enlarged gear wheel 63 and an upper gear wheel 64, approximately the same size as primary gear 60. The upper gear wheel 64 fits in the gear access opening 59. As shown in FIG. 6, the lower surface of guide plate 25 has an enlarged recess 59A surrounding the gear access opening 59, which accommodates the enlarged lower gear wheel 63. A third gear opening 66 is provided for accommodation of the primary gear 60 attached to the drive shaft of drive motor 27. The third gear opening 66 intersects the enlarged recess 59A adjacent the gear access opening 59 in which the enlarged lower gear wheel 63 is housed. At this point, the primary gear 60 meshes with the gear teeth of the enlarged gear wheel 63 upon energization of the drive motor 27. Also, the upper gear wheel 64 of intermediate gear 62 meshes with the gear teeth 48 of metering wheel 26. Gear 60 drives lower gear wheel 63 resulting in rotation of upper gear wheel 64 to rotate the metering wheel 26. The metering wheel rotates in a counterclockwise direction, as shown in FIG. 3 and at a speed greater than the speed of drive of FIG. 4, which will be proportionate to the diameter ratios of the upper and lower gear wheels of intermediate gear 62. In the configuration of FIG. 3, the second drop opening 56 of guide plate 25 is positioned over the delivery opening 29A leading to drop tube 29. Pellets drop from the regulator housing 22 into the open compartments on the metering wheel 26 and are driven in a counterclockwise direction across the base of track 42 until the compartments reach a position over the drop opening 56. From there, the pellets drop through the drop tube 29. Both of the drop openings 55 and 56 are of a sufficient diameter to span both rows of openings 51, 52, such that the compartments will drop the pellets into the first drop opening that is reached according to the direction of rotation.

In the configuration of FIGS. 3 and 5, the intermediate gear 62 is added to the assembly. In returning to the configuration of FIG. 4, the intermediate gear 62 is omitted.

As shown in FIG. 6, the undersurface of guide plate 25 has a pair of diametrically opposed positioning pegs 68, 69. As shown in FIG. 5, support platform 60 has two pairs of diametrically opposed positioning holes 71, 72 and 73, 74. The positioning pegs 68, 69 fit in one of the two pairs of holes depending on the mounting configuration. In the configuration shown in FIG. 3, the positioning pegs 68, 69 are fitted in the first pair of positioning holes 71, 72. In going from the configuration of FIG. 3 to that of FIG. 4, the guide plate is lifted from the support platform 30 and rotated from the position shown in FIG. 3 to that shown in FIG. 4. The intermediate gear 62 is removed. The guide plate 25 is then positioned on the support platform 30 with the positioning pegs engaging the second pair of positioning holes 73, 74. In moving from one position to another, the guide plate rotates about its central axis, whereas the axis of the metering wheel 26 moves and is rotated with respect to the axis of the guide plate 25. The movement repositions the metering wheel with respect to the primary gear 60 of the drve motor 27 and also repositions the drop holes 55, 56 with respect to the drop tube 29 according to which one will be in use.

In use, the guide plate is positioned on the support platform 30 in either the first position of FIG. 4 or the second position of FIG. 3, depending on whether the lower or higher speed of rotation for the metering wheel 26 is desired. In choosing the position, this automatically selects or positions the first or second drop opening 55, 56 over the drop tube 29. Selecting the configuration also determines the direction of rotation of the metering wheel, such that only the drop opening positioned over the drop tube will be reached by pellets which are contained in compartments. Selected compartments from the arrays 51, 52 are left open and the remainder are plugged according to the dosage frequency desired. A container 21 of pellets is assembled to the regulator housing 22, which is disposed over a peripheral portion of the metering wheel 26 having the compartments 51, 52. The bellows plates 39, 40 inhibit bridging in the regulator housing 22, and the pellets drop in the open compartmets as they pass under the discharge of the housing. The pellets are moved along the surface of the track 42 until they drop through a discharge opening.

The base of the recess or track 42 has a plurality of dust openings 76. As shown in FIG. 6, the openings 76 open to recesses 77 located on the undersurface of the plate 25. Chlorine and other pellets can be prone to shed particulate matter in the form of dust, which can accumulate and clog turning mechanisms. However, the dust shed from the chlorine pellets 38 falls through the dust openings 76 and is deposited on the surface of the support platform 30. From time to time, as when the pellet container 21 is recharged, the guide plate can be lifted from the support platform 30, which is then cleaned. The apparatus then continues to operate uninhibited.

While there has been shown and described a certain preferred embodiment of a pellet dispensing apparatus claimed in the invention, it is apparent that certain deviations can be had from the configuration shown without departing from the scope and spirit of the invention.

The embodiments of the invention in which an exclusive property or privilege is claimed are defined as follows:

1. A pellet dispensing apparatus for dispensing individual pellets at predetermined timed intervals, comprising:

a pellet supply means including a pellet flow regulator housing positioned beneath the pellet supply means and having a tubular passage with an inlet for receipt of pellets from the pellet supply means, and an outlet;

a horizontal support platform;

a horizontal guide plate removably mounted in surface engagement on an upper surface of the horizontal support platform;

a circular metering wheel mounted above the platform in a horizontal orientation;

said guide plate having a circular guide recess on an upper surface thereof with a recess base slidably accomodating the circular metering wheel to guide rotation of the metering wheel about its central axis;

said metering wheel having a plurality of pellet compartments, each upwardly open for receipt of a pellet and downwardly open for discharge of a pellet, said compartments generally circularly arranged on said metering wheel whereby the compartments describe a generally circular path upon rotation of the metering wheel;

said pellet flow regulator housing outlet located above the metering wheel at a first location over the circular path of rotation of the pellet compartments to discharge individual pellets into open pellet compartments as they pass beneath the first location;

a delivery opening in the platform located beneath a second location of the circular path of rotation of the pellet compartments whereby pellets are discharged from the pellet compartments into the delivery opening upon rotation of the metering wheel for delivery to a final pellet destination;

a first gear opening in the guide plate intersecting the guide recess;

drive means in the first gear opening coacting with the perimeter of the metering wheel for rotation of the metering wheel;

a dust deposit recess formed in a lower surface of the guide plate beneath the circular guide recess; and a plurality of dust openings between the circular guide recess and the dust deposit recess to permit particulate material to fall from the mounting guide recess to the dust deposit recess and accumulate on the support platform for periodic removal.

2. The pellet dispensing apparatus of claim 1 wherein: said metering wheel has a plurality of gear teeth on the perimeter thereof; said drive means for rotation of the metering wheel including a constant speed electric motor mounted to the support platform and having a motor shaft, and gear means connected to the motor shaft for coacting wth the gear teeth on the metering wheel to rotate the metering wheel.

3. The pellet dispensing apparatus of claim 1 including: closure means for selectively closing some of the pellet compartments.

4. The pellet dispensing apparatus of claim 3 wherein: said closure means is comprised as a plurality of removable plugs insertable into the pellet compartments.

5. The pellet dispensing apparatus of claim 1 wherein: said guide plate has a drop opening corresponding to the delivery opening of the support platform.

6. The pellet dispensing apparatus of claim 1 wherein: said metering wheel has gear teeth on the perimeter thereof; said drive means including a constant speed electric drive motor mounted on the support platform and having a drive shaft upwardly extended therefrom carrying a primary drive gear having gear teeth on the perimeter thereof; said guide plate having first and second drop openings and being movable between a first position and a second position on the support platform; Wherein said first position the drive gear on the drive motor is in the first gear opening and the drive gear teeth are in mesh engagement with the metering wheel gear teeth to drive the metering wheel in a first rotational direction and at a first rotational speed whereby pellets are delivered to open pellet compartments at the first location and are moved to the second location at the first drop opening in the guide plate positioned over the delivery opening in the support platform; Wherein said second position the drive gear on the drive motor is positioned in spaced relationship to the metering wheel and the second drop opening is disposed over the delivery opening, and an intermediate gear wheel is disposed between the drive gear and the metering wheel; said intermediate gear wheel having a first gear in mesh engagement with the drive gear, and a second gear coaxially connected to, and larger in diameter than, the first gear and in engagement with the gear teeth on the metering wheel whereby the motor is effective to drive the metering wheel in a second direction of rotation at a second rotational speed for delivery of pellets from the first location to the second location at the second drop opening of the guide plate positioned above the delivery opening in the support platform.

7. The pellet dispensing apparatus of claim 5 including: closure means for closing selected pellet compartments according to a predetermined discharge rate of pellets.

8. The pellet dispensing apparatus of claim 6 wherein: said plurality of pellet compartments includes a first circumferential array of compartments spaced slightly inward from the perimeter of the metering wheel, and a second circumferential array of pellet compartments spaced radially inward a slight distance from the first compartments.

9. The pellet dispensing apparatus of claim 6 wherein: said pellet supply means includes a cover plate disposed over the guide plate, and a pellet supply container assembled to the inlet opening of the pellet flow regulator housing, disposed in the tubular passage to regulate the flow of pellets.

10. The pellet dispensing apparatus of claim 9 wherein: said baffle means includes a first horizontal baffle intermediately secured in the flow regulator housing in spanning relation to a first portion of the tubular passage, and a second baffle plate fixed to the housing side wall at a location beneath the first baffle plate and downwardly inclined in spanning relationship to a second portion of the tubular passage.

11. A pellet dispensing apparatus for timed delivery of pellets into a well-type structure, comprising:

a horizontal support platform having a delivery opening, a guide plate removably mounted on the support platform, said guide plate having a first drop opening and a second drop opening and being movable on the support platform between a first position with the first drop opening in alignment with the delivery opening, and a second position with the second drop opening in alignment with the delivery opening;

a circular metering wheel;

means to fix the horizontal support platform with the delivery opening poised over a portion of a well-type structure;

said guide plate having guide means to guide rotation of the metering wheel comprised as a circular recessed track, said metering wheel located in said track and having gear teeth on the perimeter thereof;

said metering wheel having a ring of open pellet compartments that rotate in a generally circular path upon rotation of the metering wheel, said ring of open pellet compartments comprised as a first circular array of compartments spaced slightly inward of the perimeter of the metering wheel, and a second circular array of compartments spaced inward of the first array of compartments;

closure means for closing selected compartments on the metering wheel comprised as removable plugs insertable in the compartments;

pellet supply means including a pellet flow regulator housing positioned above the metering wheel having a tubular passage with an inlet for receipt of pellets from a pellet supply container, and an outlet for dispensing pellets to the metering wheel, said outlet poised over the path of rotation of the pellet compartments at a first location;

said drop openings of the guide plate positioned beneath the metering wheel under the path of rotation of the pellet compartments at a second location for receipt of pellets dispensed into the pellet compartments at the first location;

power means coacting with the perimeter of the metering wheel for rotation of the metering wheel about its central axis, said power means including a constant speed drive motor mounted on the support platform and having a drive shaft upwardly extended therefrom carrying a drive gear; said guide plate having a first gear access opening and a second gear access opening, both in intersecting relationship to the metering wheel track; wherein the first position of the guide plate said drive gear is locatable in the first gear access opening and in engagement with the drive teeth of the metering wheel to rotate the metering wheel in a first direction at a first rotational speed; second position of the guide plate said drive gear is positioned in spaced relationship to the metering wheel and is connected thereto through gear wheel being larger than the first gear wheel, and said first gear wheel being approximately the same size as the primary drive gear whereby the metering wheel is rotated in a second direction at a second rotational speed for delivery of pellets.

12. The pellet dispensing apparatus of claim 11 including: baffle means located in the tubular passage of the pellet flow regulator housing to regulate the flow of pellets, said baffle means including a first baffle plate fastened to an interior wall of the housing and extending horizontally into the tubular passage spanning a first portion thereof; and a second baffle plate secured to the interior wall of the housing at a location beneath the first baffle plate and extending at a downward inclination into the tubular passage in spanning relationship to a second portion thereof.

13. The pellet dispensing apparatus of claim 12 including: a cover plate disposed in covering relationship to the horizontal support platform and metering wheel, said flow regulator housing being secured to the cover plate.

* * * * *

UNITED STATES PATENT AND TRADEMARK OFFICE
CERTIFICATE OF CORRECTION

PATENT NO. : 4,676,399

DATED : June 30, 1987

INVENTOR(S) : Lennie L. Burckhardt

It is certified that error appears in the above-identified patent and that said Letters Patent is hereby corrected as shown below:

Column 5, line 44, "drve" should be --drive--.

Column 7, line 10, "wth" should be --with--.

Column 9, line 3, after "through" should be --a removable intermediate gear having a first gear wheel and a coaxial second gear wheel such that the first gear wheel is positioned in the second gear access opening and is in engagement with the gear teeth of the metering wheel, and the second gear wheel is positioned in drive engagement with the drive gear; said second--.

Signed and Sealed this

Twenty-sixth Day of January, 1988

*Attest:*

DONALD J. QUIGG

*Attesting Officer*     *Commissioner of Patents and Trademarks*